US012681292B2

(12) United States Patent
Druml et al.

(10) Patent No.: US 12,681,292 B2
(45) Date of Patent: Jul. 14, 2026

(54) SYSTEM-LEVEL SYNCHRONIZATION OF MICROELECTROMECHANICAL SYSTEM (MEMS) MIRRORS

(71) Applicant: Infineon Technologies AG, Neubiberg (DE)

(72) Inventors: Norbert Druml, Graz (AT); Philipp Greiner, Graz (AT)

(73) Assignee: Infineon Technologies AG, Neubiberg (DE)

(*) Notice: Subject to any disclaimer, the term of this patent is extended or adjusted under 35 U.S.C. 154(b) by 1142 days.

(21) Appl. No.: 17/708,276

(22) Filed: Mar. 30, 2022

(65) Prior Publication Data

US 2023/0314790 A1 Oct. 5, 2023

(51) Int. Cl.
*G02B 26/08* (2006.01)
*G01S 7/481* (2006.01)
*G01S 7/497* (2006.01)

(52) U.S. Cl.
CPC ........ *G02B 26/0841* (2013.01); *G01S 7/4817* (2013.01); *G01S 7/4972* (2013.01)

(58) Field of Classification Search
CPC .............. G01C 19/567; G01C 19/5712; G01C 19/5776; G01C 19/5726; G01C 19/5719; B81B 2207/03; B81B 2201/0242; B81B 7/008; G01S 7/4817; G02B 26/0841; G02B 26/0833; G02B 26/0858; G02B 26/085; G02B 26/105
See application file for complete search history.

(56) References Cited

U.S. PATENT DOCUMENTS

| | | | | |
|---|---|---|---|---|
| 7,482,730 | B2 * | 1/2009 | Davis ................. | G02B 26/0833 |
| | | | | 310/333 |
| 8,634,024 | B2 * | 1/2014 | Rothaar ............... | H04N 9/3129 |
| | | | | 348/203 |
| 11,150,331 | B2 * | 10/2021 | Druml ..................... | G01S 17/10 |
| 11,467,394 | B2 * | 10/2022 | Schroedter .............. | G01S 17/89 |
| 12,196,950 | B2 * | 1/2025 | Yoo ..................... | G02B 26/0841 |
| 2020/0319450 | A1 | 10/2020 | Druml et al. | |

FOREIGN PATENT DOCUMENTS

WO WO-2014117158 A1 * 7/2014 ........... G01J 3/4535

* cited by examiner

*Primary Examiner* — Christopher Stanford
(74) *Attorney, Agent, or Firm* — Harrity & Harrity, LLP

(57) ABSTRACT

An oscillator system includes a oscillator structure configured to oscillate about an axis; a driver configured to generate a driving signal to drive an oscillation of the oscillator structure about the axis with an oscillation phase and an oscillation frequency, wherein the driver includes a phase detector configured to generate a phase error signal representative of a phase error between a measured oscillation of the oscillator structure about the axis and an expected oscillation having the oscillation phase; and a phase controller configured to receive the phase error signal and generate an actuation value based on the phase error signal, wherein the phase controller is configured to adjust the actuation value based on the phase error signal to adjust an actuation phase of the oscillator structure about the axis to minimize the phase error. The driver is configured to generate the driving signal based on the actuation value.

27 Claims, 6 Drawing Sheets

100A

100B

SYSTEM-LEVEL SYNCHRONIZATION OF MICROELECTROMECHANICAL SYSTEM (MEMS) MIRRORS

FIELD

The present disclosure relates generally to a microelectromechanical system (MEMS) oscillating system and method for operating the same, and, more particularly, to synchronizing oscillations about two or more scanning axes.

BACKGROUND

Lissajous scanning is a type of scanning implemented in display application, light scanning applications, and light steering applications, to name a few. For example, Lissajous scanning may be used in displays, Light Detection and Ranging (LIDAR), and automotive headlights in which light beams are steered by a scanning system according to a Lissajous pattern.

Lissajous scanning is typically done by two resonant scanning axes which are each driven at constant scanning frequency with a defined frequency ratio/difference therebetween that forms a specific Lissajous pattern and frame rate. In order to implement Lissajous scanning properly, synchronization of the two scanning axes is required. However, maximizing the stability of the Lissajous pattern is also desirable.

Thus, it is desirable to synchronize oscillations about two or more scanning axes on a system level while also maximizing the stability of the Lissajous pattern.

SUMMARY

Embodiments provide microelectromechanical system (MEMS) mirror synchronizing system and methods for operating the same, and, more particularly, to synchronizing two scanning axes in a scanning system.

One or more embodiments provide an oscillator system, including: a first oscillator structure configured to oscillate about a first axis; a first driver configured to generate a first driving signal to drive an oscillation of the first oscillator structure about the first axis with a first oscillation phase and a first oscillation frequency, wherein the first driver includes a first phase detector configured to generate a first phase error signal representative of a first phase error between a measured oscillation of the first oscillator structure about the first axis and an expected oscillation having the first oscillation phase; and a first phase controller configured to receive the first phase error signal and generate a first actuation value based on the first phase error signal, wherein the first phase controller is configured to adjust the first actuation value based on the first phase error signal to adjust a first actuation phase of the first oscillator structure about the first axis to minimize the first phase error, wherein the first driver is configured to generate the first driving signal based on the first actuation value.

One or more embodiments provide an oscillator system, including: a first oscillator structure configured to oscillate about a first axis; a first driver configured to generate a first driving signal to drive an oscillation of the first oscillator structure about the first axis with a first oscillation phase and a first oscillation frequency, w herein the first driver is configured to generate a first position signal having a signal frequency corresponding to an actual frequency of the oscillation of the first oscillator structure about the first axis; and a first frequency controller configured to receive the first position signal and change a first actuation frequency of the first oscillator structure with respect to the first axis based on the signal frequency of the first position signal such that the actual frequency follows the first oscillation frequency, wherein the first driver is configured to generate the first driving signal based on the first actuation frequency.

BRIEF DESCRIPTION OF THE DRAWINGS

Embodiments are described herein making reference to the appended drawings.

DETAILED DESCRIPTION

Figure 1A:
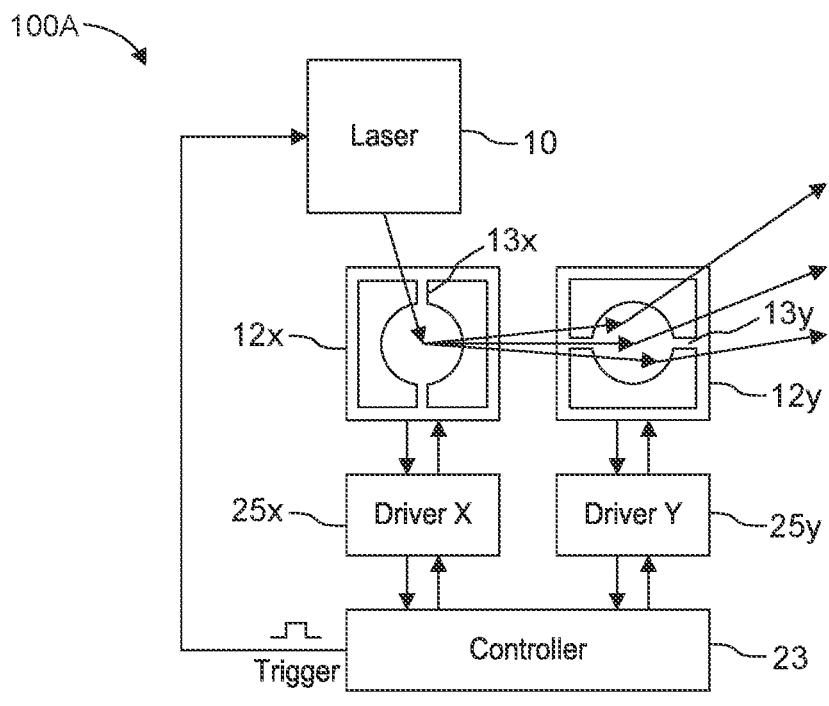
FIGS. 1A and 1B are a schematic block diagrams of Lissajous scanning systems according to one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter, or a filter. A sensor device may be integrated on a single chip, although in other embodiments a plurality of chips or also components external to a chip may be used for implementing a sensor device.

Moreover, embodiments may relate to optical transmitters and optical transmitter systems configured to transmit light beams or pulses according to a scanning pattern, and, more particularly, according to a Lissajous scanning pattern. Light beams include visible light, infrared (IR) light, or other type of illumination signals. In some applications, the transmitted light may be backscattered by an object back towards the system where the backscattered light is detected by a sensor. The sensor may convert the received backscattered light into an electric signal, for example a current signal or a voltage signal, that may be further processed by the system to generate object data and/or an image.

Lissajous scanning is a type of scanning implemented in display applications, light scanning applications, and light steering applications, to name a few. For example, Lissajous scanning may be used in displays, Light Detection and Ranging (LIDAR), and automotive headlights in which light beams are steered by a scanning system according to a Lissajous pattern. Lissajous scanning is typically done by two resonant scanning axes which are each driven at constant scanning frequency with a defined frequency ratio/difference therebetween that forms a specific Lissajous pattern and frame rate. In order to properly carry out Lissajous scanning, synchronization of the two scanning axes is required.

Lissajous scanning may be used in extended reality (XR) technologies. For example, augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eye-glasses, smart contact lenses, head-up displays (HUDs), and head-mounted displays (HMDs), or projected directly onto a user's retina, as is the case for virtual retinal displays.

Virtual reality (VR) is a technology that entirely replaces the real-world environment of a user with a computer-generated virtual environment. Thus, a user is presented with a completely digital environment in which computer-generated stereo visuals surround the user. In a VR simulated environment, a VR headset that provides 360-degree vision may be used.

A mixed reality (MR) experience combines elements of both AR and VII such that real-world and digital objects interact. Here, a real-world environment is blended with a virtual one.

These technologies, as well as others that enhance a user's senses, may be referred to as extended reality (XR) technologies. A microelectromechanical system (MEMS) mirror-based laser beam scanner (LBS), as the one described herein, is one way to implement XR technologies. The laser beam scanner is capable of delivering small form factor, low power consumption, and high brightness at a relatively low system cost.

In LIDAR systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm. For example, an ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate an area referred to as the "field of view" in a continuous scan fashion. Each firing of the laser beam by the light sources can result in a scan line in the field of view. By emitting successive light pulses in different scanning directions, an image can be projected into the field of view, as is the case in XR technologies, or the field of view can be scanned and objects within the area can be detected and imaged, as is the case in LIDAR technologies.

Figure 1B:
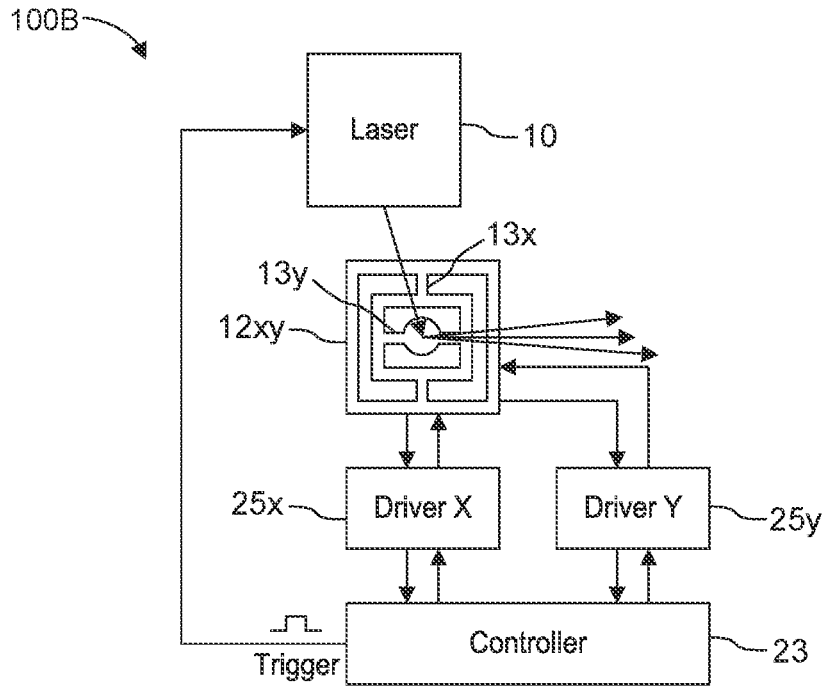

FIGS. 1A and 1B are a schematic block diagrams of Lissajous scanning systems 100A and 110B, respectively, according to one or more embodiments. In particular, the Lissajous scanning system 100A includes two one-dimensional (1D) MEMS mirrors 12x and 12y that are used to steer or otherwise deflect light beams (pulses) according to a Lissajous scanning pattern. In contrast, the Lissajous scanning system 100B includes a single two-dimensional (2D)

MEMS mirror 12*xy* that is used to steer or otherwise deflect light beams (pulses) according to a Lissajous scanning pattern.

The MEMS mirrors 12*x* and 12*y* are mechanical moving mirrors (i.e., a MEMS micro-mirror) integrated on a semiconductor chip (not shown). A MEMS mirror according to the embodiments described herein is configured to oscillate via rotation about either a single resonant scanning axis (i.e., a 1D MEMS mirror) or two resonant scanning axes (i.e., a 2D MEMS mirror) that are typically orthogonal to each other. An oscillation of the MEMS mirror on a scanning axis may be done so between two predetermined extremum deflection angles (e.g., +/−15 degrees). A Lissajous scanner is configured to control the steering of the light beams in two dimensions (e.g., in a horizontal x-direction and in a vertical y-direction).

In the example shown in FIG. 1A, two 1D MEMS mirrors 12*x* and 12*y* are used to steer light beams in two dimensions. MEMS mirror 12*x* includes a first resonant scanning axis 13*x* that enables the MEMS mirror 12*x* to steer light in the x-direction, whereas MEMS mirror 12*y* includes a second resonant scanning axis 13*y* that enables the MEMS mirror 12*yx* to steer light in the y-direction. The two MEMS mirrors 12*x* and 12*y* are arranged sequentially along a transmission path of the light beams such that one of the MEMS mirrors (e.g., MEMS mirror 12*x*) first receives a light beam and steers it in a first dimension and the second one of the MEMS mirrors (e.g., MEMS mirror 12*y*) receives the light beam from the first MEMS mirror and steers it in a second dimension. As a result, the two MEMS mirrors 12*x* and 12*y* operate together to steer a light beam generated by an illumination unit 10 in two-dimensions. In this way, the two MEMS mirrors 12*x* and 12*y* can direct a light beam at a desired 2D coordinate (e.g., an x-y coordinate) in the field of view. Multiple light beams can be steered by the two MEMS mirrors 12*x* and 12*y* at different 2D coordinates of a Lissajous pattern.

In the example illustrated in FIG. 1B, one 2D MEMS mirror 12*xy* is used to steer light beams in two dimensions. MEMS mirror 12*xy* includes the first resonant scanning axis 13*x* that enables the MEMS mirror 12*xy* to steer light in the x-direction and the second resonant scanning axis 13*y* that enables the MEMS mirror 12*xy* to steer light in the y-direction. In this way, a single MEMS mirror can steer light beams received from the illumination unit 10 in both the x-direction and the y-direction. As a result, the MEMS mirror 12*xy* can direct a light beam at a desired 2D coordinate (e.g., an x-y coordinate) in the field of view. Multiple light beams can be steered by the MEMS mirror 12*xy* at different 2D coordinates of a Lissajous pattern.

Each MEMS mirror 12*x*, 12*y*, and 12*xy* is a resonator (i.e., a resonant MEMS mirror) configured to oscillate "side-to-side" about each of its scanning axes at a resonance frequency such that the light reflected from the MEMS mirror oscillates back and forth in a scanning direction of a respective scanning axis. As will be described in further detail below, different resonance frequencies may be used for each scanning axis 13*x* and 13*y* for defining the Lissajous pattern.

For each scanning axis, the MEMS mirrors 12*x*, 12*y*, and 12*xy* includes an actuator structure used to drive the mirror about its respective scanning axis. The actuator structure may include interdigitated finger electrodes made of interdigitated mirror combs and frame combs to which a drive voltage (i.e., an actuation signal or driving signal) is applied by the MEMS driver. Applying a difference in electrical potential between interleaved mirror combs and frame combs creates a driving force between the mirror combs and the frame combs, which creates a torque on the mirror body about the intended scanning axis. The drive voltage can be toggled between two voltages resulting in an oscillating driving force. The oscillating driving force causes the mirror to oscillate back and forth on its rotation axis between two extrema. Depending on the configuration, this actuation can be regulated or adjusted by adjusting the drive voltage off time, a voltage level of the drive voltage, or a duty cycle.

In other examples, actuation methods may include electromagnetic actuation and piezoelectric actuators. In electromagnetic actuation, the micro mirror may be "immersed" in a magnetic field and an alternating electric current through conductive paths may create the oscillating torque around the scanning axis. Piezoelectric actuators may be integrated in the leaf springs or the leaf springs may be made of piezoelectric material to produce alternating beam bending forces in response to an electrical signal and generate the oscillation torque.

MEMS mirrors 12*x*, 12*y*, and 12*xy* exhibit a non-linear behavior due the torsional stiffness about the rotation axis caused by the leaf spring assemblies such that an oscillation frequency of the mirror increases with an increase in oscillation amplitude (i.e., tilt angle amplitude) in a non-linear manner. Thus, the stiffening of the leaf springs as the mirror rotates causes the MEMS mirror to be more strongly non-linear.

The Lissajous scanning systems 100A and 110B each includes an illumination unit 10 (i.e., a light transmitter) that includes at least one light source (e.g., at least one laser diode or light emitting diode) that is configured to transmit light beams (pulses) along a transmission path towards the MEMS mirror(s). The illumination unit 10 may sequentially transmit multiple light pulses according to a trigger signal received from a system controller 23.

The Lissajous scanning systems 100A and 110B also include a system controller 23 that is configured to control components of the scanning systems. In certain applications, such as LIDAR, the system controller 23 may also be configured to receive raw data from a light sensor (not illustrated) and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals.

The system controller 23 is configured to generate a trigger signal used to trigger the illumination unit 10 to generate light pulses. Thus, the system controller 23 controls the timing light pulses are fired from the illumination unit 10 via the trigger signal. The system controller 23 is also configured to set a driving frequency of a MEMS mirror for each of its scanning axes and is capable of synchronizing the oscillations about the two scanning axes 13*x* and 13*y*. In particular, the system controller 23 is configured to control an actuation of a MEMS mirror about each scanning axis by controlling a driving signal. The system controller 23 may control a frequency, a phase, a duty cycle, a high-voltage (HV) level, and/or a low-voltage (LV) level of the driving signal to control the actuation.

The Lissajous scanning systems 100A and 110B both include a MEMS driver 25*x* for driving a MEMS mirror (i.e., MEMS mirror 12*x* or 12*xy*) about the first scanning axis 13*x* and a MEMS driver 25*y* for driving a MEMS mirror (i.e., MEMS mirror 12*y* or 12*xy*) about the second scanning axis 13*y*. Each MEMS driver 25*x*, 25*y* actuates and senses the rotation position of the mirror about its respective scanning axis, and provides position information (e.g., tilt angle or degree of rotation about the rotation axis) of the mirror to the system controller 23. Based on this position information, the laser sources of the illumination unit 10 may be triggered by the system controller 23. Thus, a higher accuracy in position sensing of the MEMS mirror results in a more accurate and precise control of other components of the scanning system.

As noted above, a drive voltage (i.e., an actuation signal or driving signal) is applied by a MEMS driver to an actuator structure of the MEMS mirror that corresponds to its corresponding scanning axis to drive the oscillation of the MEMS mirror about that scanning axis. The drive voltage can be switched or toggled between an HV level and a LV level resulting in an oscillating driving force. The LV level of the driving signal is zero when the drive voltage is off but may also be a non-zero value. When the LV level is zero, it can be said that the drive voltage is toggled on and off (HV on/off). The oscillating driving force causes the mirror to oscillate back and forth on its rotation axis between two extrema. The drive voltage may be a constant drive voltage, meaning that the drive voltage is the same voltage when actuated (i.e., toggled on) or one or both of the HV and LV levels of the driving signal may be adjustable. However, it will be understood that the drive voltage is being toggled between HV and LV levels in order to produce the mirror oscillation. Depending on the configuration, this actuation can be regulated or adjusted by adjusting the drive voltage off time, a voltage level of the drive voltage, or a duty cycle. As noted above, frequency and phase of the driving signal can also be regulated and adjusted.

Hence, a light transmission technique includes transmitting the beams of light into the field of view from one or two transmission mirrors that use two resonant scanning axes to transmit according to a Lissajous scanning pattern. The transmission mirrors continuously oscillate in resonance about each scanning axes such that the beams of light are projected into the field of view that moves across the field of view as the transmission mirror(s) changes the transmission direction. Moreover, additional conditions are set by the system controller 23 in order to synchronize the oscillations about the two scanning axes for generating a Lissajous scanning pattern as a repeatable pattern.

To make the Lissajous pattern reproduce itself periodically with a frame rate FR frequency [Hz], the two resonant scanning axes are each driven at a target scanning frequency f1, f2 with a defined frequency ratio/difference therebetween that forms a repeatable Lissajous pattern (frame) with a frame rate FR. A new frame begins each time the Lissajous pattern restarts, which occurs when a phase difference between a mirror phase about scanning axis 13x and a mirror phase about scanning axis 13y is zero. The system controller 23 synchronizes the oscillations about the two resonant scanning axes to ensure this defined frequency ratio/difference is maintained based on measurements acquired of the oscillations.

In the examples described herein, frequency f1 is the driving frequency in the time domain of a MEMS mirror (e.g., MEMS mirror 12x or 12xy) about the scanning axis 13x and frequency f2 is the driving frequency in the time domain of a MEMS mirror (e.g., MEMS mirror 12y or 12xy) about the scanning axis 13y. The oscillations about the two scanning axes may drift out of synchronization and must be brought into synchronization by the system controller 23.

Figure 2:
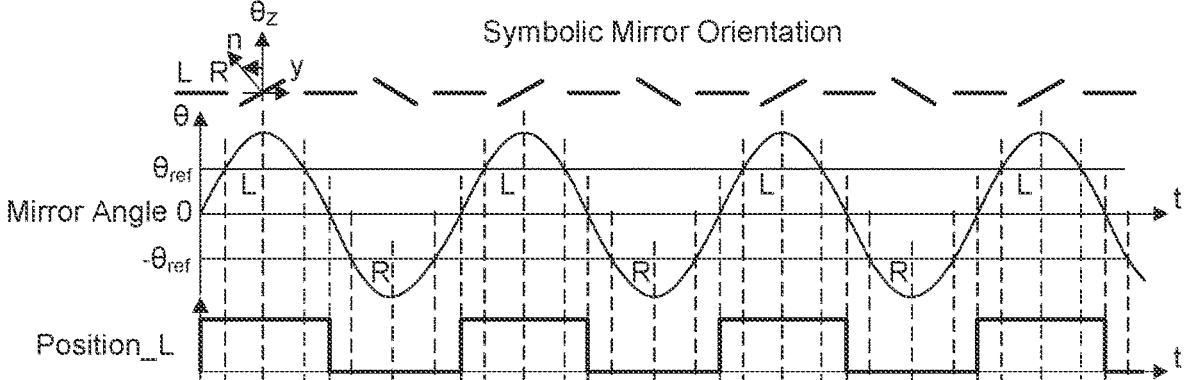
FIG. 2 illustrates a signal diagram of various signals generated by a MEMS driver based on a mirror angle $\theta$ and/or position according to one or more embodiments.

FIG. 2 illustrates a signal diagram of various signals generated by a MEMS driver 25 based on the mirror angle θ and/or position, including a position signal (Position_L).

For example, the position signal (Position_L) may be a pulsed signal during which a first pulse transition (e.g., falling-edge transition) is triggered at a zero-crossing as the mirror oscillates in a first rotation direction (e.g., from left to right) and a second pulse transition (e.g., rising-edge transition) is triggered at a zero-crossing as the mirror oscillates in a second rotation direction (e.g., from right to left). Furthermore, the signal is "high" when the mirror points in one direction (e.g., points left) and the signal is "low" when the mirror points in a second direction (e.g., points right). Thus, the position signal not only indicates a zero-crossing event by triggering a pulse transition, but also indicates absolute phase information by indicating the directional tilt of the mirror. As the intervals between zero-crossing events increase, the frequency of the position signal decreases. Thus, the position signal is also representative of a measured frequency of a MEMS mirror about a scanning axis.

Alternatively, a short pulse may be generated by each MEMS driver 25x and 25y at the each zero-crossing event such that a pulsed position signal (Position_L) is output to the system controller 23. That is, the signal remains low (or high) between zero-crossing pulses. In this case, the absolute phase information indicating in which direction the mirror is moving would be absent. Based on this position signal a phase and/or a frequency of two or more position signals can be compared.

Based on this position signal, at least one of phase or frequency information of the MEMS mirror can be extracted from the position signal as a measurement of an actual state of the MEMS mirror. Accordingly, driver 25x is configured to receive a measurement signal representative of an entire angular trajectory traversed by the its MEMS mirror throughout its oscillation, detect zero-crossing events at which a value of the measurement signal is detected to be equal to predefined value that corresponds to a zero displacement angle of the MEMS mirror structure with respect to the axis 13x, and generate a position signal that indicates each of the detected first zero-crossing events with a signal transition or a signal pulse. Likewise, driver 25y is configured to receive a measurement signal representative of an entire angular trajectory traversed by the its MEMS mirror throughout its oscillation, detect zero-crossing events at which a value of the measurement signal is detected to be equal to predefined value that corresponds to a zero displacement angle of the MEMS mirror structure with respect to the axis 13y, and generate a position signal that indicates each of the detected first zero-crossing events with a signal transition or a signal pulse.

A measurement signal may be provided to a driver in the following manner. As the mirror oscillates, the capacitance between the finger electrodes changes according to the mirror's rotation position. A MEMS driver is configured to measure the capacitance between the interdigitated finger electrodes, and determine a rotation position or angle position of the MEMS mirror therefrom. By monitoring the capacitance, the MEMS driver can detect the zero-crossing events and a timing thereof, and can determine the tilt angle of the MEMS mirror. It can also generate the position signal by monitoring the capacitance. The MEMS driver can also use the measured capacitance to determine a mirror frequency, and record the information in memory at the MEMS driver or at the system controller.

The sensing of the position of a MEMS mirror is performed based on a detector that is configured to measure the capacitance. For example, as the MEMS mirror moves, the geometry of the finger structure changes, resulting in a change in the geometry of the capacitance. As the geometry of the capacitance changes, the capacitance itself changes. Thus, a specific capacitance corresponds directly with a specific position (i.e., tilt angle) of the MEMS mirror. By sensing the capacitance of the finger structure, the MEMS driver can monitor and track the oscillations of the mirror, and determine a specific position of the MEMS mirror, including the zero-crossing.

One way to measure the capacitance is to measure a current flowing through the finger structure, convert the measured current into a voltage, and then further correlate the voltage to a capacitance and/or a rotation angle. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver can also record the currents and voltages measured during the measuring of the capacitance. Thus, increasing the accuracy of position sensing of the mirror may improve the overall accuracy of the LIDAR system.

Each MEMS driver 25x and 25y may send respective position information to the system controller 23 so that the system controller 23 can use the position information to control the triggering of the laser pulses of the illumination unit 10. The position information may also be used by the system controller as feedback information such that the system controller 23 can maintain a stable operation of the MEMS mirror 12xy via control signals provided to the MEMS drivers 25x and 25y and also maintain synchronization with other MEMS mirrors.

Hence, a scanning technique includes transmitting the beams of light into the field of view from a transmission mirror that uses two resonant scanning axes to transmit according to a Lissajous scanning pattern. The transmission mirror continuously oscillates in resonance about each scanning axis such that the beams of light are projected into the field of view that moves across the field of view as the transmission mirror changes the transmission direction. Moreover, additional conditions are set by the system controller 23 in order to generate a Lissajous scanning pattern. The following conditions are used to synchronize the driving about the two scanning axes according to the Lissajous pattern.

Figure 3A:
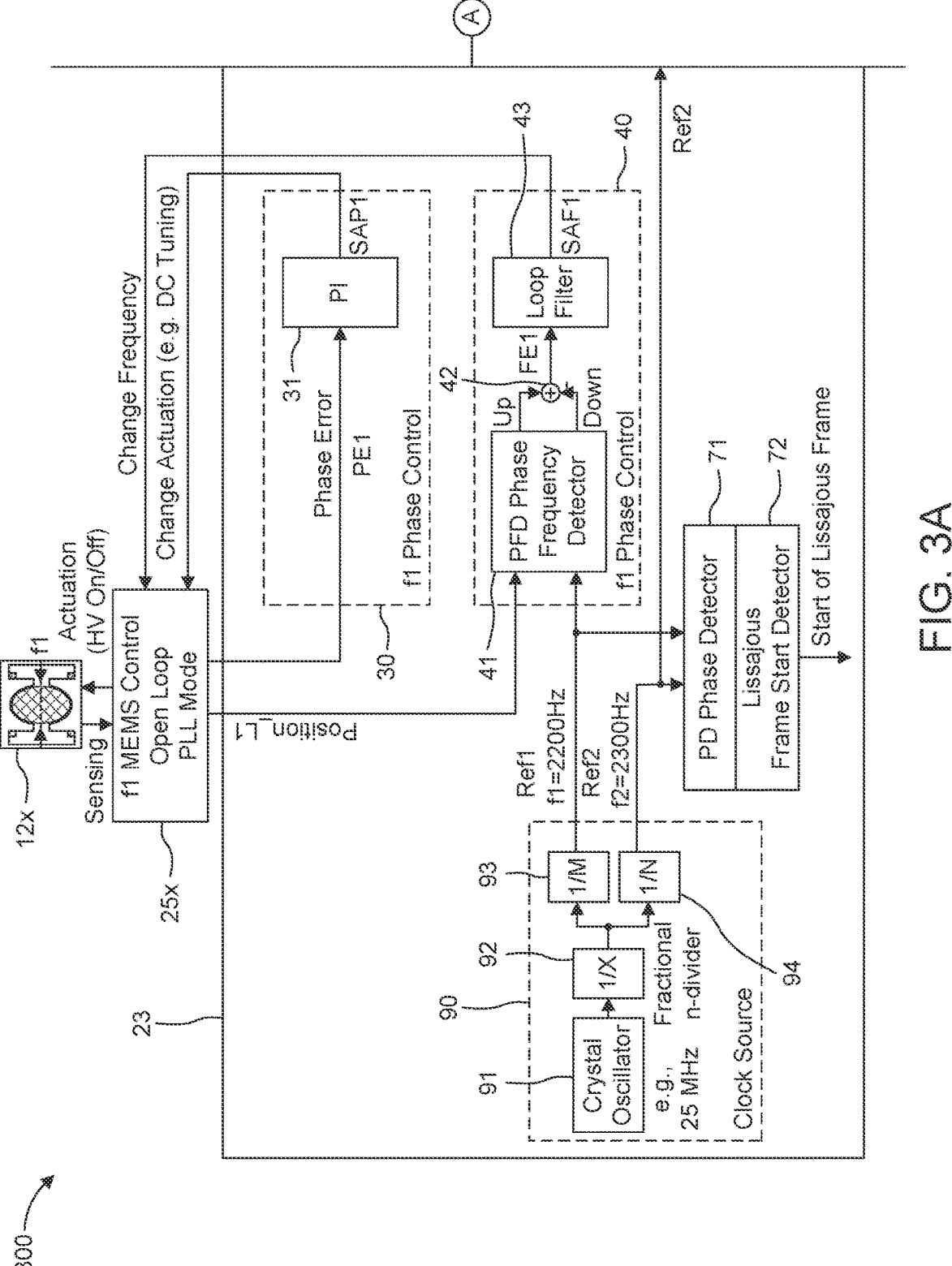
FIGS. 3A and 3B illustrate a schematic block diagram of a scanning system according to one or more embodiments.
Figure 3B:
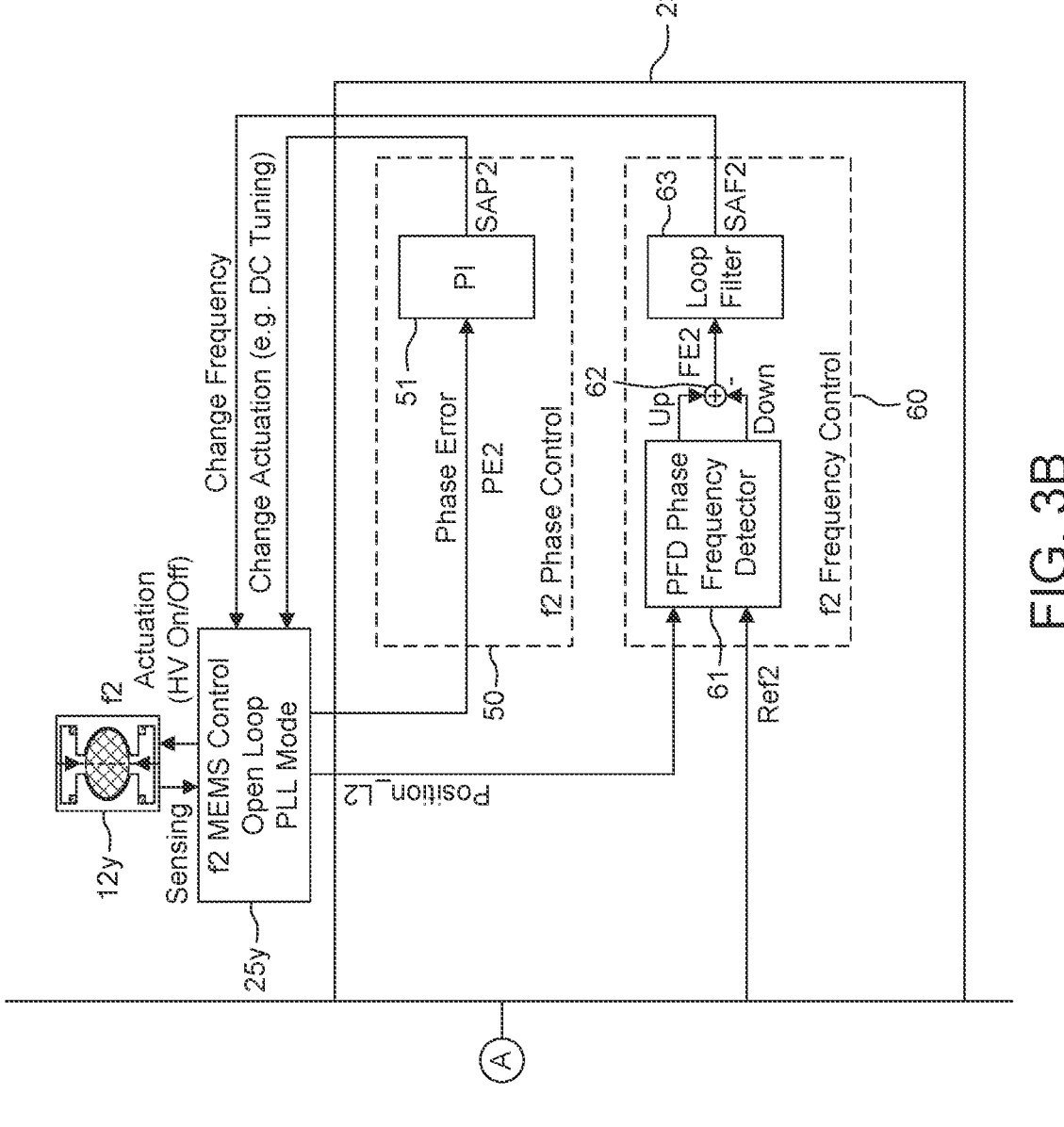

FIGS. 3A and 3B illustrate a schematic block diagram of a scanning system 300 according to one or more embodiments. FIGS. 3A and 3B represent a single schematic block diagram that share a common border (A) and are intended to be extensions of each other. Thus, FIG. 3A illustrates a first portion (e.g., a left side) of the scanning system 300 and FIG. 3B illustrates a second portion (e.g., a right side) of the scanning system 300.

The scanning system 300 includes a MEMS mirror 12x, a MEMS driver 25x operably coupled to the MEMS mirror 12x, a MEMS mirror 12y, a MEMS driver 25y operably coupled to the MEMS mirror 12y, and a system controller 23 (i.e., a synchronization controller) operatively coupled to the MEMS driver 25x and the MEMS driver 25y. While two 1D MEMS mirrors are illustrated in this example, it will be appreciated that the two MEMS mirrors 12x and 12y can be replaced with a single 2D MEMS mirror, as illustrated in FIG. 1B.

The scanning system 300 employs both phase and frequency synchronization control for both scanning axes 13x and 13y. Both scanning axes are operated in an open loop phase-locked loop (PLL) control mode. A respective target frequency is imprinted on each scanning axis and is therefore rock-solid stable. The phase between expected zero-crossings (ZC) and measured zero-crossings is controlled via change in actuation of the driving signal.

The scanning system 300 includes a reference signal generator 90 that generates two reference signals Ref1 and Ref2 having reference frequencies (i.e., target frequencies) f1 and f2, respectively. Both reference signals Ref1 and Ref2 can be generated by any suitable clock source such as crystal oscillator 91 or an FPGA (not illustrated). In this example, the reference frequencies f1 and f2 are set at 2200 Hz and 2300 Hz, respectively, but are not limited thereto. Since reference frequency f1 is lower than reference frequency f2, reference frequency f1 may be referred to as the slow axis frequency and reference frequency f2 may be referred to as the fast axis frequency. However, it will be appreciated that reference frequency f1 could be set to be higher than reference frequency f2 and could therefore be the faster axis frequency.

In this example, the reference signal generator 90 uses a crystal oscillator 91 to generate a clock signal, a fractional n-divider 92 that divides the clock signal by integer X, a divider 93 that divides by integer M, and a divider 94 that divides by integer N to generate two reference signals Ref1 and Ref2 that have a defined fractional relationship at which mirrors 12x and 12y operate about their respective axes 13x and 13y. Thus, the frequency of mirror 12x is synchronized to frequency f1 via the f1 frequency controller 40 and the frequency of mirror 12y is synchronized to frequency f2 via the f2 frequency controller 60. In addition, dividers 93 and 94 are configured to maintain the defined fractional relationship between the oscillation frequencies of the two axes based on integers N and M (N M, with X, M, and N being positive integers).

Thus, the reference signal generator 90 establishes the fixed frequencies f1 and f2 according to a predefined fractional relationship, and the frequency controllers 40 and 60 are configured to independently maintain the oscillation frequency of their respective mirrors based on respective reference signals Ref1 and Ref2 and respective position signals Position_L1 and Position L2.

The system controller 23 further includes a phase detector 71 that receives both reference signals Ref1 and Ref2 and measures a phase difference therebetween. Because frequencies f1 and f2 are different, the phase difference changes in a periodic manner from 0° to 360°. The phase detector 61 includes logic that evaluates the phase of both reference signals and generates a voltage signal which represents the difference in phase between two reference signals. Alternatively, the phase detector 71 could be configured to receive the two position signals Position_L1 and Position_L2 instead of reference signals Ref1 and Ref2 and measure a phase difference therebetween.

A Lissajous frame start detector 72 receives the phase difference from the phase detector 61 and determines a start of a next Lissajous frame based thereon. In particular, the Lissajous frame start detector 72 detects a start of a Lissajous frame when the phase difference between the reference signals (or the position signals) determined by the phase detector 61 is zero or at some other predetermined value. The next frame starts at this predetermined phase difference.

Thus, the Lissajous frame start detector 72 is configured to generate and output a frame start detection signal upon detecting the predetermined phase difference based on the reference signals Ref1 and Ref2. The next frame signal may be output to a signal processor that processes image data received by LIDAR sensors that utilize the scanning mirrors 12*x* and 12*y*. In particular, the signal processor may use the next frame signal to identify a start of a new frame of image data, and thus an end of a current frame.

MEMS driver 25*x* provides two output signals: a phase error signal PE1 and a position signal (Position_L1) as previously described in reference to FIG. 2. The phase error signal PE1 is a value representative of a timing difference between an expected zero-crossing and a measured zero-crossing of the oscillation about scanning axis 13*x*. An error value is output for each detected zero-crossing. The phase error signal PE1 is provided to a phase controller 30 of the system controller and the position signal Position_L1 is provide to a frequency controller 40 of the system controller 23.

The phase controller 30 includes a loop filter 31 (e.g., a proportional-integral (PI) controller) that receives the phase error signal PE1 and changes the actuation phase of the driving signal generated by the MEMS driver 25*x*. The loop filter 31 may change the actuation phase of the driving signal by changing the duty cycle, the HV level, and/or the LV level of the driving signal. Consequently, the phase error will be controlled to a minimum to drive the phase error signal PE1 to zero without affecting the reference frequency.

Specifically, the loop filter 31 is configured to receive the phase error signal PE1 and generate an actuation phase value SAP1 based on the phase error signal, where the loop filter 31 adjusts the actuation value based on the phase error signal to adjust an actuation phase of the MEMS mirror 12*x* about the axis 13*x* to minimize the phase error. The actuation phase value SAP1 may be a duty cycle value, an HV level value, or an LV level value for changing the duty cycle, the HV level, or the LV level of the driving signal, respectively, without affecting the actuation frequency of the MEMS mirror 12*x* about axis 13*x*.

For example, the driving signal comprises an ON duration and an OFF duration that define a duty cycle of the driving signal, a first signal level set for the ON duration, and a second signal level set for the OFF duration. The actuation phase value SAP1 may control at least one of the ON duration or the OFF duration for controlling the first duty cycle of the first driving signal. Alternatively, the actuation phase value SAP1 may control the first signal level or the second signal level of the driving signal. The second signal level may be a zero or a non-zero voltage.

The frequency controller 40 includes a phase frequency detector (PFD) 41 that is configured to receive position signal Position_L1 from the MEMS driver 25*x* and a reference signal Ref1, whose frequency is equal to the (target) driving frequency f1. In particular, the PFD 41 receives both signals and determines whether the actual (measured) frequency of mirror 12*x* is faster, slower, or equal to the target frequency f1 provided by the reference signal Ref1. The PFD 41 includes logic that evaluates the frequency of both signals, determines how the frequency of position signal Position_L1 compares to frequency f1 of the reference signal Ref1, and adjusts a frequency error signal FE1 based on the determination.

The frequency error signal FE1 may be representative of (e.g., proportional to) a difference between reference frequency f1 and the actual MEMS axis' f1. This error value feeds into a loop filter 43 (e.g., a PI controller) that changes the actuation frequency at MEMS axis 13*x*. Consequently, this actuation frequency is imprinted into the MEMS axis 13*x* and the oscillation about MEMS axis 13*x* strictly follows this frequency.

For example, the PFD 41 may generate either an "up" control pulse or a "down" control pulse and provides the respective control pulse to a frequency error signal generator 42. In response to receiving an up-control signal, the frequency error signal generator increments a value of the frequency error signal. Conversely, in response to receiving a down-control signal, the frequency error signal generator decrements the value of the frequency error signal. The frequency error signal FE indicates the frequency relationship between the measured frequency and the reference frequency.

For instance, the frequency error signal FE1 may be a positive value if mirror 12*x* is operating slower than the reference frequency f1, thus indicating that the frequency of mirror 12*x* should be increased. Alternatively, the frequency error signal FE1 may be a negative value if mirror 12*x* is operating faster than the reference frequency f1, thus indicating that the frequency of the mirror 12*x* should be decreased. Alternatively, the frequency error signal may be a zero if the frequency of the mirror 12*x* is matched with the frequency of the reference signal Ref1, thus indicating that the current frequency of the mirror 12*x* should be maintained unchanged.

The frequency controller 40 further includes a loop filter 43 that is configured to receive the frequency error signal FE, and sets a frequency value SAF1 (e.g., a digitally-controlled oscillator (DCO) value) based on the frequency error signal FE. The frequency value SAF1 serves as a configuration setting to a DCO of the MEMS driver 25*x*. For example, the frequency value SAF1 may adjust the counter speed of the DCO, which in turn adjusts the actuation frequency of the driving signal. For example, the higher the counter speed of the DCO, the higher the actuation frequency. The loop filter 43 then provides the frequency value SAF1 to the MEMS driver 25*x*, which generates the driving signal based on the frequency value received from the loop filter 43. In turn, the MEMS mirror 12*x* either oscillates faster or slower in order to match the reference frequency ft Thus, the loop filter 43 changes the actuation frequency of the MEMS mirror 12*x* with respect to axis 13*x* based on the frequency of the position signal Position_L1 such that the actual frequency of the MEMS mirror 12*x* follows the reference frequency f1. The driver 25*x* generates the driving signal based on the actuation frequency.

Both SAP1 and SAF1 are control values that are independently generated by the system controller 23 to independently control either an actuation phase or an actuation frequency of MEMS mirror 12*x* about axis 13*x* without affecting the other actuation parameter. The driving signal is provided to the MEMS mirror 12*x* to control the phase/frequency of the mirror oscillation such that the phase error and frequency error are zero or substantially zero.

Similarly, MEMS driver 25*y* provides two output signals: a phase error signal PE2 and a position signal (Position_L2) as previously described in reference to FIG. 2. The phase error signal PE2 is a value representative of a timing difference between an expected zero-crossing and a measured zero-crossing of the oscillation about scanning axis 13*y*. An error value is output for each detected zero-crossing. The phase error signal PE2 is provided to a phase controller 50 of the system controller and the position signal Position_L2 is provide to a frequency controller 60 of the system controller 23.

The phase controller 50 includes a loop filter 51 (e.g., a PI controller) that receives the phase error signal PE2 and changes the actuation phase of the driving signal generated by the MEMS driver 25*y*. The loop filter 51 may change the actuation phase of the driving signal by changing the duty cycle, the HV level, and/or the LV level of the driving signal.

Consequently, the phase error will be controlled to a minimum to drive the phase error signal PE2 to zero without affecting the reference frequency.

Specifically, the loop filter 51 is configured to receive the phase error signal PE2 and generate an actuation phase value SAP2 based on the phase error signal, where the loop filter 51 adjusts the actuation value based on the phase error signal to adjust an actuation phase of the MEMS mirror 12$y$ about the axis 13$y$ to minimize the phase error. The actuation phase value SAP2 may be a duty cycle value, an HV level value, or an LV level value for changing the duty cycle, the HV level, or the LV level of the driving signal, respectively, without affecting the actuation frequency of the MEMS mirror 12$y$ about axis 13$y$.

For example, the driving signal comprises an ON duration and an OFF duration that define a duty cycle of the driving signal, a first signal level set for the ON duration, and a second signal level set for the OFF duration. The actuation phase value SAP2 may control at least one of the ON duration or the OFF duration for controlling the first duty cycle of the first driving signal. Alternatively, the actuation phase value SAP2 may control the first signal level or the second signal level of the driving signal. The second signal level may be a zero or a non-zero voltage.

The frequency controller 60 includes a phase frequency detector (PFD) 61 that is configured to receive position signal Position_L2 from the MEMS driver 25$y$ and a reference signal Ref2 whose frequency is equal to the (target) driving frequency f2. In particular, the PFD 61 receives both signals and determines whether the actual (measured) frequency of mirror 12$y$ is faster, slower, or equal to the target frequency f2 provided by the reference signal Ref2. The PFD 61 includes logic that evaluates the frequency of both signals, determines how the frequency of position signal Position_L2 compares to frequency f2 of the reference signal Ref2, and adjusts a frequency error signal FE2 based on the determination.

The frequency error signal FE2 may be representative of (e.g., proportional to) a difference between reference frequency f2 and the actual MEMS axis' f2. This error value feeds into a loop filter 63 (e.g., a proportional-integral (PI) controller) that changes the actuation frequency at the MEMS axis 13$y$. Consequently, this actuation frequency is imprinted into the MEMS axis 13$y$ and the oscillation about MEMS axis 13$y$ strictly follows this frequency.

For example, the PFD 61 may generate either an "up" control pulse or a "down" control pulse and provides the respective control pulse to a frequency error signal generator 62. In response to receiving an up-control signal, the frequency error signal generator increments a value of the frequency error signal. Conversely, in response to receiving a down-control signal, the frequency error signal generator decrements the value of the frequency error signal. The frequency error signal FE indicates the frequency relationship between the measured frequency and the reference frequency.

For instance, the frequency error signal FE2 may be a positive value if mirror 12$y$ is operating slower than the reference frequency f2, thus indicating that the frequency of mirror 12$y$ should be increased. Alternatively, the frequency error signal FE2 may be a negative value if mirror 12$y$ is operating faster than the reference frequency f2, thus indicating that the frequency of the mirror 12$y$ should be decreased. Alternatively, the frequency error signal may be a zero if the frequency of the mirror 12$y$ is matched with the frequency of the reference signal Ref2, thus indicating that the current frequency of the mirror 12$y$ should be maintained unchanged.

The frequency controller 60 further includes a loop filter 63 that is configured to receive the frequency error signal FE, and sets a frequency value SAF2 (e.g., a digitally-controlled oscillator (DCO) value) based on the frequency error signal FE. The frequency value SAF2 serves as a configuration setting to a DCO of the MEMS driver 25$y$. For example, the frequency value SAF2 may adjust the counter speed of the DCO, which in turn adjusts the actuation frequency of the driving signal. For example, the higher the counter speed of the DCO, the higher the actuation frequency. The loop filter 63 then provides the frequency value SAF2 to the MEMS driver 25$y$, which generates the driving signal based on the frequency value received from the loop filter 63. In turn, the MEMS mirror 12$y$ either oscillates faster or slower in order to match the reference frequency f2 without affecting the mirror phase. Thus, the loop filter 63 changes the actuation frequency of the MEMS mirror 12$y$ with respect to axis 13$y$ based on the frequency of the position signal Position_L2 such that the actual frequency of the MEMS mirror 12$y$ follows the reference frequency f2. The driver 25$y$ generates the driving signal based on the actuation frequency.

Both SAP2 and SAF2 are control values that are independently generated by the system controller 23 to independently control either an actuation phase or an actuation frequency of MEMS mirror 12$y$ about axis 13$y$ without affecting the other actuation parameter. The driving signal is provided to the MEMS mirror 12$y$ to control the phase/frequency of the mirror oscillation such that the phase error and frequency error are zero or substantially zero.

Figure 4A:
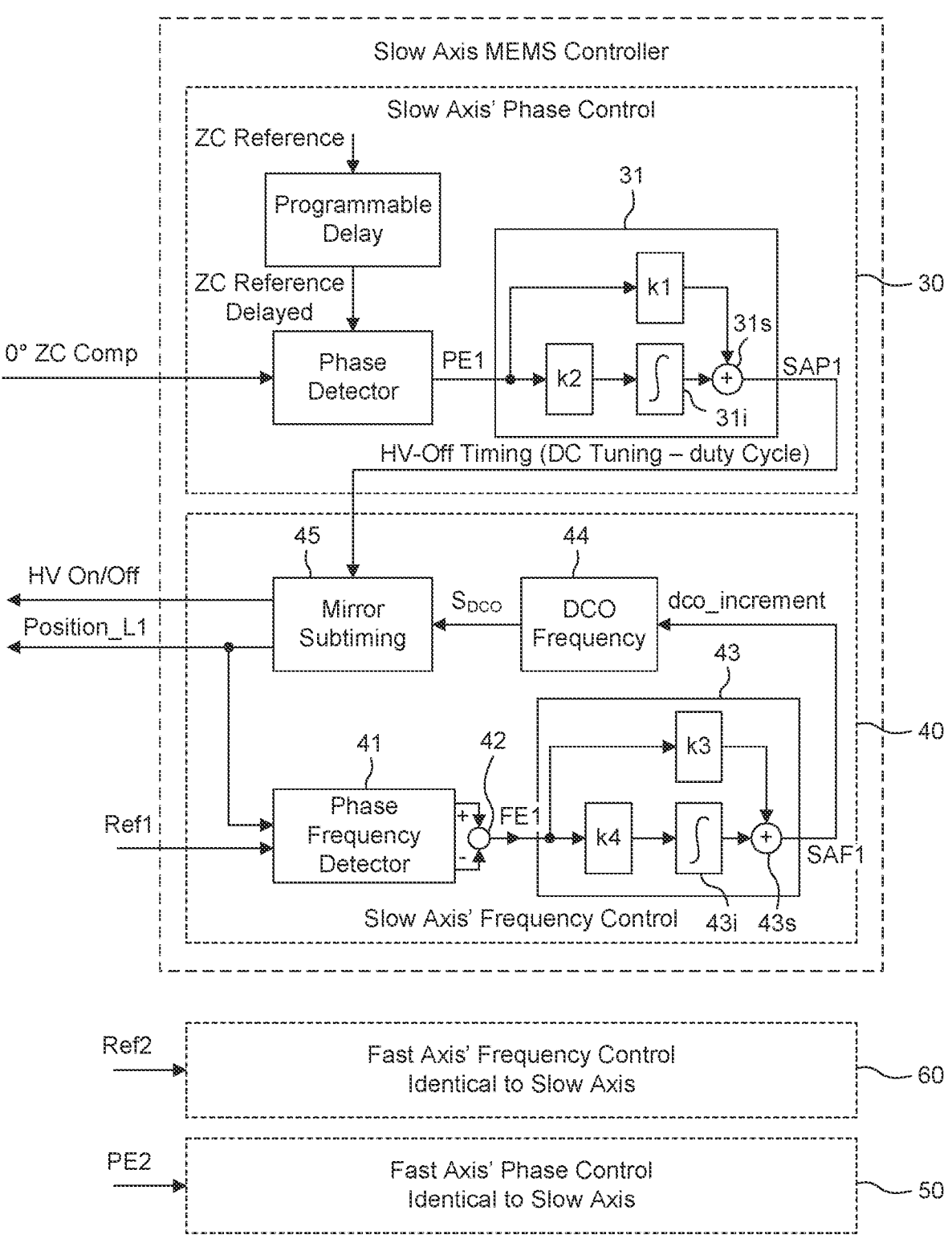
FIG. 4A illustrates a schematic block diagram of a control system implemented in the scanning system according to one or more embodiments.
Figure 4B:
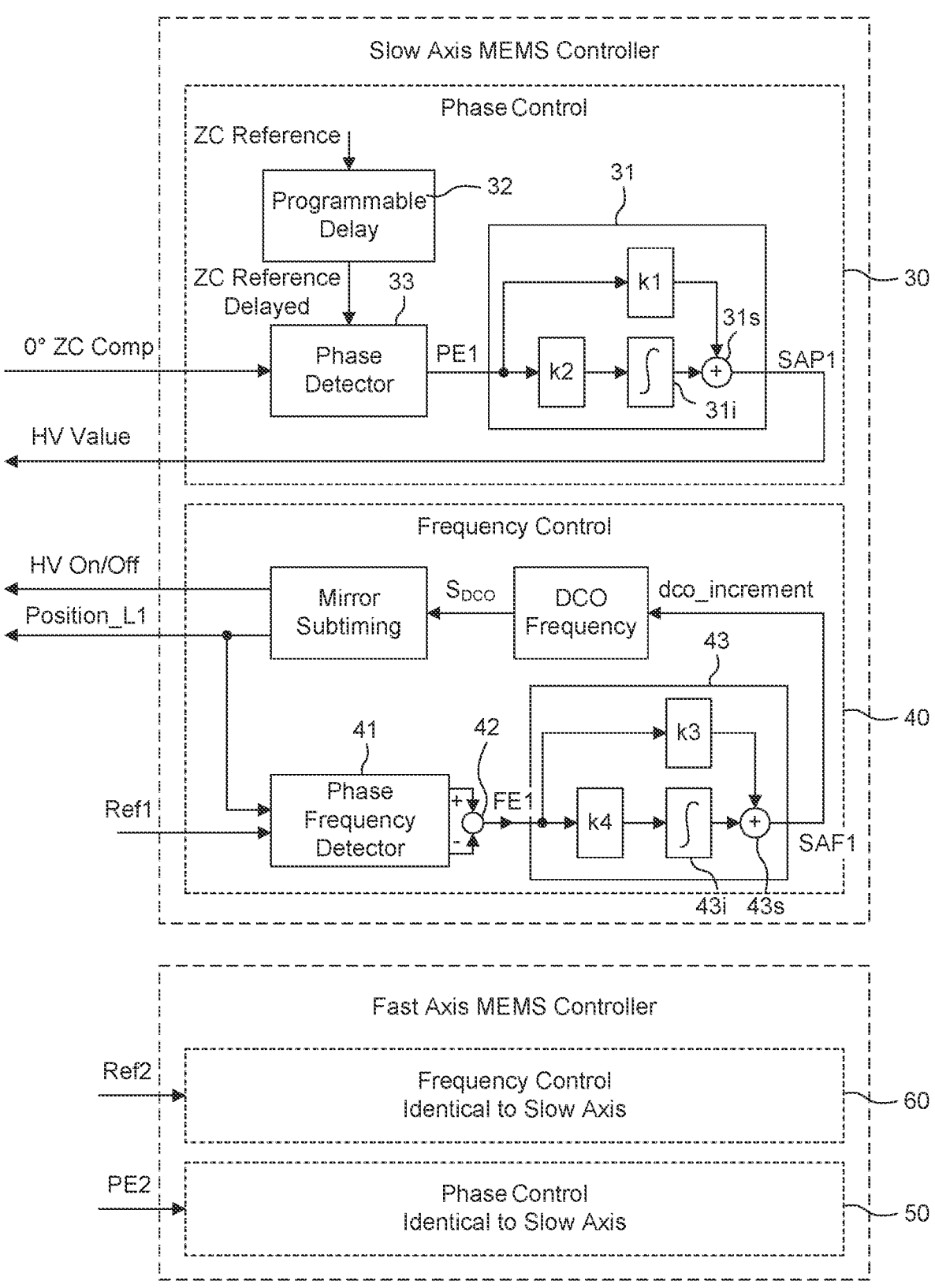
FIG. 4B illustrates a schematic block diagram of another control system implemented in the scanning system according to one or more embodiments.

FIGS. 4A and 4B illustrate a schematic block diagrams of control systems of the scanning system 300 according to one or more embodiments. The control systems includes the phase controller 30 for slow axis phase control, the frequency controller 40 for slow axis frequency control, the phase controller 50 for fast axis phase control, the frequency controller 60 for fast axis frequency control. The phase controller 50 includes similar components to that of phase controller 30 and the description of the phase controller 30 can be similarly extended to the phase controller 50. Likewise, the phase controller 60 includes similar components to that of phase controller 40 and the description of the phase controller 40 can be similarly extended to the phase controller 60.

The phase controller 30 incudes a programmable delay unit 32 and a phase detector 33 that may reside in the MEMS driver 25$x$. The programmable delay unit 32 receives a zero-crossing (ZC) reference signal and applies a programmable delay thereto to generate a delayed ZC reference signal. The ZC reference signal indicated expected zero-crossings of the MEMS mirror 12$x$ about axis 13$x$. The programmable delay may be imposed to account for the amount of time it takes for the MEMS driver 25$x$ to measure actual zero-crossing events at the MEMS mirror 12$x$ and generate a measurement signal 0° ZC Comp that is indicative of measured (actual) zero-crossing events. The phase detector 33 is configured to receive the delayed ZC reference signal and the measurement signal 0° ZC Comp, measure a phase difference therebetween, and output the phase error signal PE1 representative of the measured phase difference. Loop filter 31 then generates an actuation value SAP1 that regulates the actuation phase of MEMS mirror 12$x$ based on the phase error signal PE1. The loop filter 31 may be a PI controller that includes two gain factors k1 and k2, an integrator $31i$, and a summer $32s$ to generate a control variable (i.e., the actuation value SAP1).

In FIG. 4A, the phase controller 30 is configured to regulate an actuation phase of mirror $12x$ by regulating the duty cycle of the driving signal. Here, the actuation value controls the OFF duration of the driving signal to control the duty cycle of the driving signal. The actuation value SAP1 is provided to a mirror sub-timer 45 of the MEMS driver $25x$. The mirror sub-timer 45 counts from 0 to a maximum counter value and then repeats. The time between counting from a counter value of zero to the maximum counter value represents a desired timing between consecutive zero-crossing events. The mirror sub-timer 45 is configured to regulate the duty cycle HV on/off timing based on the actuation value SAP1 and the counter value. In this way, the mirror sub-timer 45 is a duty cycle controller.

In FIG. 4B, the phase controller 30 is configured to regulate an actuation phase of mirror $12x$ by regulating the HV level of the driving signal. Similarly, the phase controller 30 could regulate the actuation phase of mirror $12x$ by regulating the LV level of the driving signal.

In FIG. 4A, the frequency controller 40 incudes a DCO 44 and the mirror sub-timer 45 that may reside in the MEMS driver $25x$. The mirror sub-timer 45 is shared with the phase controller 30 in the case where the phase controller 30 regulates the duty cycle. The frequency value SAF1 is a DCO increment value that either increases or decreases the DCO frequency of a signal SDCO generated by the DCO 44. The DCO frequency directly correlates to f1. The mirror sub-timer 45 receives the DCO signal SDCO and adjusts the counter speed of its counter (i.e., the rate at which it counts from a zero counter value to the maximum counter value) based on the DCO signal SDCO—the higher the DCO frequency the faster the counter speed. Thus, the period of the driving signal (i.e., the duration of one on/off cycle) becomes shorter at higher DCO frequencies and longer for lower DCO frequencies. Changing the period of the driving signal changes the actuation frequency of the driving signal.

The mirror sub-timer 45 indicates the HV on time and the HV off times based on the period of the driving signal as well as the duty cycle of the driving signal. In FIG. 4A, the period of the driving signal and the duty cycle of the driving signal are independently adjusted by the frequency control and phase control, respectively. In FIG. 4B, the duty cycle of the driving signal is fixed at a preconfigured value and only the period of the driving signal is adjusted for controlling the actuation frequency.

The mirror sub-timer 45 may also be configured to generate the position signal Position_L1 and provide the position signal Position_L1 to the PFD 41. Together with the frequency error signal generator 42, the PDF 41 generates the frequency error signal FE1 that is provided to the loop filter 43. The loop filter 43 may be a PI controller that includes two gain factors k3 and k4, an integrator $43i$, and a summer $43s$ to generate a control variable (i.e., the frequency value SAF1).

Using the disclosed synchronization approaches results in a more stable Lissajous pattern because the axis' frequency is imprinted onto the target axis and the axis' phase error can be slowly compensated without affecting the reference frequency of the axis.

Although embodiments described herein relate to a MEMS device with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An oscillator system, comprising:
a first oscillator structure configured to oscillate about a first axis;
a first driver configured to generate a first driving signal to drive an oscillation of the first oscillator structure about the first axis with a first target oscillation frequency, wherein the first driver includes a first phase detector configured to generate a first phase error signal representative of a first phase error between a measured oscillation of the first oscillator structure about the first axis and an expected oscillation having a first target oscillation phase;
a first frequency control loop configured to regulate a frequency of the oscillation of the first oscillator structure about the first axis; and
a first phase control loop comprising a first phase controller configured to receive the first phase error signal and generate a first actuation value based on the first phase error signal, wherein the first phase controller is configured to adjust the first actuation value based on the first phase error signal to adjust a first actuation phase of the first oscillator structure about the first axis to minimize the first phase error,
wherein the first driver is configured to generate the first driving signal based on the first actuation value, and
wherein the first frequency control loop and the first phase control loop are independent control loops with no overlap.

2. The oscillator system of claim 1, wherein the first phase controller is a first loop filter configured to generate the first actuation value based on the first phase error signal, and transmit the first actuation value to the first driver.

3. The oscillator system of claim 1, wherein:
the first driving signal comprises an ON duration and an OFF duration that define a first duty cycle of the first driving signal, and
the first actuation value controls at least one of the ON duration or the OFF duration for controlling the first duty cycle of the first driving signal.

4. An oscillator system, comprising:
a first oscillator structure configured to oscillate about a first axis;
a first driver configured to generate a first driving signal to drive an oscillation of the first oscillator structure about the first axis with a first oscillation frequency, wherein the first driver includes a first phase detector configured to generate a first phase error signal representative of a first phase error between a measured oscillation of the first oscillator structure about the first axis and an expected oscillation having a first target oscillation phase; and
a first phase controller configured to receive the first phase error signal and generate a first actuation value based on the first phase error signal, wherein the first phase controller is configured to adjust the first actuation value based on the first phase error signal to adjust a first actuation phase of the first oscillator structure about the first axis to minimize the first phase error,
wherein the first driver is configured to generate the first driving signal based on the first actuation value,
wherein the first driving signal comprises an ON duration and an OFF duration that define a first duty cycle of the first driving signal, a first signal level set for the ON duration, and a second signal level set for the OFF duration, and
wherein the first actuation value controls the first signal level or the second signal level of the first driving signal.

5. The oscillator system of claim 1, wherein the first phase controller is configured to adjust the first actuation value based on the first phase error signal to adjust the first actuation phase of the first oscillator structure independent of the first target oscillation frequency such that the frequency of the oscillation is not affected by an adjustment to the first actuation phase.

6. The oscillator system of claim 1, wherein the first driver is configured to receive the first actuation value and control an actuation of the first oscillator structure based on the first actuation value such that a phase of the oscillation of the first oscillator structure follows the first target oscillation phase independent of the frequency of the oscillation of the first oscillator structure.

7. The oscillator system of claim 1, wherein the first driver is configured to detect a zero-crossing time of the first oscillator structure, and the first phase detector is configured calculate a difference between the detected zero-crossing time and a reference zero-crossing time as the first phase error.

8. The oscillator system of claim 1, wherein the first driver is configured to generate a first position signal having a signal frequency corresponding to an actual frequency of the oscillation of the first oscillator structure about the first axis, wherein the first frequency control loop comprises:
a frequency controller configured to receive the first position signal and change an actuation frequency of the first oscillator structure with respect to the first axis based on the signal frequency of the first position signal such that the actual frequency follows the first target oscillation frequency, wherein the first driver is configured to generate the first driving signal based on the actuation frequency.

9. The oscillator system of claim 8, wherein the frequency controller comprises:

a phase frequency detector configured to receive the first position signal and a reference signal having the first target oscillation frequency and generate a first frequency error signal as a difference between the signal frequency of the first position signal and the first target oscillation frequency of the reference signal; and a loop filter configured to receive the first frequency error signal and generate a control signal based on the first frequency error signal, wherein the first driver is configured to receive the first frequency error signal and change the actuation frequency to match the first target oscillation frequency.

10. The oscillator system of claim 8, wherein the first driver is configured to receive a first frequency error signal representative of a difference between the signal frequency of the first position signal and the first target oscillation frequency and generate the first driving signal based on the first frequency error signal such that a frequency of the first driving signal matches the first target oscillation frequency.

11. The oscillator system of claim 1, wherein:

the first oscillator structure is configured to oscillate about a second axis, wherein the oscillator system further comprises:

a second driver configured to generate a second driving signal to drive an oscillation of the first oscillator structure about the second axis with a second target oscillation frequency, wherein the second driver includes a second phase detector configured to generate a second phase error signal representative of a second phase error between a measured oscillation of the first oscillator structure about the second axis and an expected oscillation having a second target oscillation phase;

a second frequency control loop configured to regulate a frequency of the oscillation of the first oscillator structure about the second axis; and a second phase control loop comprising a second phase controller configured to receive the second phase error signal and generate a second actuation value based on the second phase error signal, wherein the second phase controller is configured to adjust the second actuation value based on the second phase error signal to adjust a second actuation phase of the first oscillator structure about the second axis to minimize the second phase error, wherein the second driver is configured to generate the second driving signal based on the second actuation value, and wherein the second frequency control loop and the second phase control loop are independent control loops with no overlap.

12. The oscillator system of claim 11, wherein the second driver is configured to generate a second position signal having a signal frequency corresponding to an actual frequency of the oscillation of the first oscillator structure about the second axis, wherein the second frequency control loop comprises:

a frequency controller configured to receive the second position signal and change an actuation frequency of the first oscillator structure with respect to the second axis based on the signal frequency of the second position signal such that the actual frequency follows the second target oscillation frequency, wherein second driver is configured to generate the second driving signal based on the actuation frequency.

13. The oscillator system of claim 1, further comprising:

a second oscillator structure configured to oscillate about a second axis;

a second driver configured to generate a second driving signal to drive an oscillation of the second oscillator structure about the second axis with a second target oscillation frequency, wherein the second driver includes a second phase detector configured to generate a second phase error signal representative of a second phase error between a measured oscillation of the second oscillator structure about the second axis and an expected oscillation having a second target oscillation phase;

a second frequency control loop configured to regulate a frequency of the oscillation of the second oscillator structure about the second axis; and a second phase control loop comprising a second phase controller configured to receive the second phase error signal and generate a second actuation value based on the second phase error signal, wherein the second phase controller is configured to adjust the second actuation value based on the second phase error signal to adjust a second actuation phase of the second oscillator structure about the second axis to minimize the second phase error, wherein the second driver is configured to generate the second driving signal based on the second actuation value, and wherein the second frequency control loop and the second phase control loop are independent control loops with no overlap.

14. The oscillator system of claim 13, wherein the second driver is configured to generate a second position signal having a signal frequency corresponding to an actual frequency of the oscillation of the second oscillator structure about the second axis, wherein the second frequency control loop comprises:

a frequency controller configured to receive the second position signal and change an actuation frequency of the second oscillator structure with respect to the second axis based on the signal frequency of the second position signal such that the actual frequency follows the second target oscillation frequency, wherein second driver is configured to generate the second driving signal based on the actuation frequency.

15. The oscillator system of claim 13, wherein:

the first driver is configured to generate a first position signal having a signal frequency corresponding to an actual frequency of the oscillation of the first oscillator structure about the first axis, the second driver is configured to generate a second position signal having a signal frequency corresponding to an actual frequency of the oscillation of the second oscillator structure about the second axis, the first frequency control loop comprises a first frequency controller configured to receive the first position signal and a first reference signal having the first target oscillation frequency, and change an actuation frequency of the first oscillator structure with respect to the first axis based on a first difference between the signal frequency of the first position signal and the first target oscillation frequency of the first reference signal such that the actual frequency of the oscillation of the first oscillator structure follows the first target oscillation frequency, and the second frequency control loop comprises a second frequency controller configured to receive the second position signal and a second reference signal having the second target oscillation frequency, and change an actuation frequency of the second oscillator structure with respect to the second axis based on a second difference between the signal frequency of the second position signal and the second target oscillation frequency of the second reference signal such that the actual frequency of the oscillation of the second oscillator structure follows the second target oscillation frequency.

16. The oscillator system of claim 15, further comprising:
a phase detector configured to receive the first position signal and the second position signal and measure a phase difference therebetween; and
a Lissajous frame start detector configured to receive the measured phase difference and determine a start of a Lissajous frame based on the measured phase difference.

17. The oscillator system of claim 16, wherein the phase detector is arranged on a start control path that is separate from the first phase control loop and the second phase control loop.

18. The oscillator system of claim 15, further comprising:
a clock source comprising an oscillator configured to generate a clock signal, where the clock source is configured to generate the first reference signal having the first target oscillation frequency and the second reference signal having the second target oscillation frequency from the clock signal,
wherein the first target oscillation frequency and the second target oscillation frequency are different and have a fixed frequency difference therebetween.

19. The oscillator system of claim 18, further comprising:
a phase detector configured to receive the first reference signal and the second reference signal and measure a phase difference therebetween; and
a Lissajous frame start detector configured to receive the measured phase difference and determine a start of a Lissajous frame based on the measured phase difference.

20. The oscillator system of claim 18, wherein the clock source includes a fractional n-divider configured to divide the clock signal by a first integer to generate divided clock signal, a first divider that divides the divided clock signal by a second integer to generate the first reference signal having the first target oscillation frequency, and a second divider that divides the divided clock signal by a third integer to generate the second reference signal having the second target oscillation frequency.

21. The oscillator system of claim 18, wherein the clock source includes a plurality of dividers configured to generate, from the clock signal, the first reference signal and the second reference signal that have a defined fractional relationship.

22. An oscillator system, comprising:
a first oscillator structure configured to oscillate about a first axis;
a first driver configured to generate a first driving signal to drive an oscillation of the first oscillator structure about the first axis with a first target oscillation phase and a first target oscillation frequency, wherein the first driver is configured to generate a first position signal having a signal frequency corresponding to an actual frequency of the oscillation of the first oscillator structure about the first axis;

a phase control loop configured to regulate a phase of the oscillation of the first oscillator structure about the first axis; and
a frequency control loop comprising a first frequency controller configured to receive the first position signal and change a first actuation frequency of the first oscillator structure with respect to the first axis based on the signal frequency of the first position signal such that the actual frequency follows the first target oscillation frequency,
wherein the first driver is configured to generate the first driving signal based on the first actuation frequency, and
wherein the frequency control loop and the phase control loop are independent control loops with no overlap.

23. The oscillator system of claim 22, wherein the first driver is configured to receive a first measurement signal representative of an entire angular trajectory traversed by the first oscillator structure throughout its oscillation, detect first zero-crossing events of the first oscillator structure at which a value of the first measurement signal is detected to be equal to first predefined value that corresponds to a zero displacement angle of the first oscillator structure with respect to the first axis, and generate the first position signal that indicates each of the detected first zero-crossing events with a rising signal transition or a falling signal transition.

24. The oscillator system of claim 22, further comprising:
a second oscillator structure configured to oscillate about a second axis;
a second driver configured to generate a second driving signal to drive an oscillation of the second oscillator structure about the second axis with a second target oscillation phase and a second target oscillation frequency, wherein the second driver is configured to generate a second position signal having a signal frequency corresponding to an actual frequency of the oscillation of the second oscillator structure about the second axis; and
a second frequency controller configured to receive the second position signal and a second reference signal having the second target oscillation frequency, and change a second actuation frequency of the second oscillator structure with respect to the second axis based on a second difference between the signal frequency of the second position signal and the second target oscillation frequency of the second reference signal such that the actual frequency of the oscillation of the second oscillator structure follows the second target oscillation frequency,
wherein the second driver is configured to generate the second driving signal based on the second actuation frequency.

25. The oscillator system of claim 24, further comprising:
a phase detector configured to receive the first position signal and the second position signal and measure a phase difference therebetween; and
a Lissajous frame start detector configured to receive the measured phase difference and determine a start of a Lissajous frame based on the measured phase difference.

26. The oscillator system of claim 24, further comprising:
a clock source comprising an oscillator configured to generate a clock signal, where the clock source is configured to generate a first reference signal having the first target oscillation frequency and the second reference signal having the second target oscillation frequency from the clock signal, wherein the first target oscillation frequency and the second target oscillation frequency are different and have a fixed frequency difference therebetween.

27. The oscillator system of claim 26, further comprising:

a phase detector configured to receive the first reference signal and the second reference signal and measure a phase difference therebetween; and a Lissajous frame start detector configured to receive the measured phase difference and determine a start of a Lissajous frame based on the measured phase difference.

* * * * *